PHOTOSENSITIVE INFORMATION RETRIEVAL DEVICE

Filed July 3, 1961

4 Sheets-Sheet 1

INVENTOR.
VLADIMIR K. ZWORYKIN
BY
ATTORNEY

Nov. 2, 1965 V. K. ZWORYKIN 3,215,848

PHOTOSENSITIVE INFORMATION RETRIEVAL DEVICE

Filed July 3, 1961 4 Sheets-Sheet 2

INVENTOR.
VLADIMIR K. ZWORYKIN
BY
Samuel Cole
ATTORNEY

PHOTOSENSITIVE INFORMATION RETRIEVAL DEVICE

Filed July 3, 1961

4 Sheets-Sheet 3

INVENTOR.
VLADIMIR K. ZWORYKIN
BY [signature]
ATTORNEY

INVENTOR.
VLADIMIR K. ZWORYKIN
BY
[signature]
ATTORNEY

United States Patent Office 3,215,848
Patented Nov. 2, 1965

3,215,848
PHOTOSENSITIVE INFORMATION RETRIEVAL DEVICE

Vladimir K. Zworykin, Princeton, N.J., assignor to Radio Corporation of America, a corporation of Delaware Filed July 3, 1961, Ser. No. 121,743
12 Claims. (Cl. 250—219)

The present invention relates to data processing and, more particularly, to information retrieval. The invention is discussed in terms of the diagnosis of diseases, however, it is to be understood that the invention is of broader applicability. For example, the invention is useful in such widely different areas as trouble shooting complex electrical or mechanical equipment to the selection of personnel having predetermined skills or other characteristics, in both cases by the comparison of input data with data previously stored in the data processing system memory.

With the emergence in recent years of modern, high speed, data processing equipment, there has been considerable discussion of ways in which this equipment may be employed to aid the physician in making a diagnosis. One obstacle has been the vast amount of data which must be considered in determining the "best match" between the symptoms exhibited by the patient and those of known diseases. The number of such diseases is high—10,000 or more, and each disease may have 600 or more symptoms. Further, the symptoms for each disease may have a different significance. Accordingly, the amount of storage and the amount of processing of data which would be required in conventional systems, such as high speed digital systems, would be formidable.

An object of the present invention is to provide an improved method of and arrangement for matching input data with data stored in the memory of a data processing system.

Another object of the present invention is to provide an improved method and system for medical diagnoses.

A more specific object of the invention is to provide a simple and relatively inexpensive system for automatically diagnosing a disease.

According to the present invention, the symptoms for each of the large number of diseases are recorded. The symptoms exhibited by a patient are also recorded. The recorded patient's symptoms, as a group, are compared with each group of symptoms previously recorded for each disease and a record is produced of the extent of the match between the patient's symptoms and the symptoms with which they compared only when the degree of match exceeds a given percentage.

The memory employed is preferably a film such as a 35 millimeter photographic film. The symptoms for a given disease are recorded in the form of a spectrum of transparent lines of varying widths, lengths, densities, or shapes corresponding to the significance of the symptoms for that disease. The "transparency" of each spectrum may be adjusted so that the amount of light passing through it is the same for each disease. This may be accomplished in any one of a number of different ways, as is explained later. The patient's symptoms are recorded on a film in a similar spectrum, however, each symptom is assigned the same significance. The patient film is then compared with the master film by aligning the symptom lines of the two films and passing light through the superimposed films. Whenever the amount of light passing through the superimposed films exceeds a given value, indicating that the extent of the match is greater than a given percentage, a record is produced which identifies the disease and indicates the probability that the patient has that disease.

The invention is described in greater detail below and is illustrated in the following drawings of which:

Similar reference numerals are applied to similar parts throughout the figures.

Figure 1:
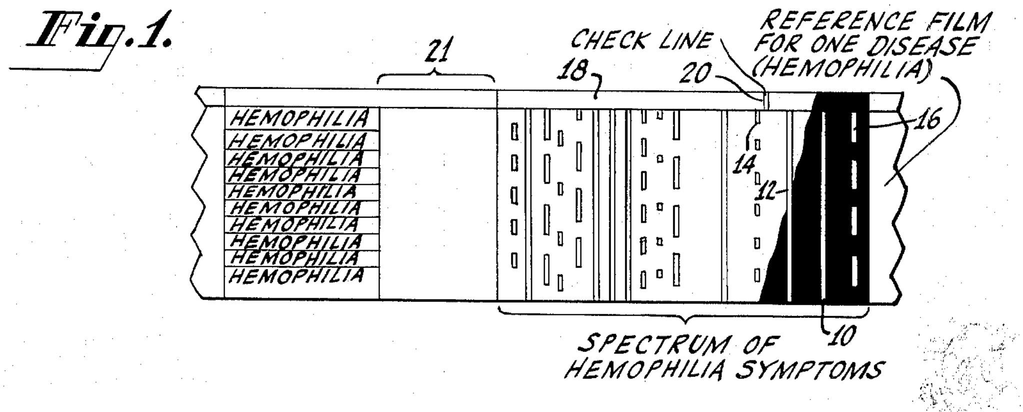
FIG. 1 illustrates a portion of the "master film"—the memory, of the present invention. This portion consists of a length of film on which symptoms of one particular disease are recorded.

As used here, the term "symptom" refers to a manifestation of a disease such as the presence of a specific type of bacteria, a rash, an infected throat, swelling, the results of laboratory tests, and so on. The significance of the symptom refers to the weight which must be accorded that symptom in making the diagnosis. For example, a temperature of 105° is highly significant as a symptom of pneumonia whereas a sore throat is much less significant.

The memory of the invention consists of unperforated 35 millimeter photographic film. The symptoms of different diseases are recorded on successive portions of the film. The portion of the film shown in FIG. 1 has recorded thereon the symptoms of one particular disease, hemophilia. Although this disease has upwards of 700 symptoms, only 15 to 20 are shown to keep the drawing simple. These symptoms appear as transparent lines of the same width such as 10, 12, 14 which extend across an otherwise opaque film. The opaque portion of the film is indicated by black area. Lines 10 and 12 are continuous and are capable of passing the greatest amount of light. The symptoms represented by these lines are highly significant. A symptom represented by a dashed line such as 14 is much less significant since this line is capable of passing less light than lines such as 10 and 12. The symptom represented by a dashed line such as 16 is somewhat more significant than the symptom represented by line 14 but is less significant than the symptom represented by line 12.

The method for attaching significance to the different symptoms illustrated in FIG. 1 is but one of a number of different ways this can be done. For example, another way of permitting more or less light to pass through certain lines is to make all lines continuous and of the same width and length but of different degrees of transparency. Another method may be to make the lines of widths corresponding to the significance of the symptoms represented by the lines. Other methods are also possible.

The entire spectrum of a disease such as hemophilia may be recorded, for example, on a six inch length of film. For example, 600 symptoms corresponding to 600 lines can easily be recorded on six inches of film. Such lines may, for example, be 0.003 inch thick and spaced from one another roughly 0.007 inch.

At the upper edge of the film above the symptom spectrum is an opaque area 18 which contains a single, transparent check line 20. The purpose of this check line is to align the disease spectrum with the symptom spectrum recorded on another film, the patient film, as is explained in more detail later.

The left portion of the film identifies the disease displayed on the film. In the present instance, the disease in hemophilia. The word "hemophilia" is, therefore, written at the left side of this portion of the film. The same word appears on ten different lines for reasons which are given later.

A transparent space 21 appears between the portion of the film exhibiting the symptom spectrum and the portion of the film identifying the spectrum. The purpose of this space is to permit a very narrow beam of light to pass through the film and expose a restricted area on the patient film. The position of this beam of light (and of the subsequently developed dot or mark on the patient film which corresponds in position to the beam position) is indicative of the probability that the patient has a particular disease. This is discussed further later.

The entire film shown in FIG. 1 may have a length of about 10 inches—six inches for the disease spectrum and four inches for the blank space and the disease identification. Thus, a length of master film of about 830 feet can store the symptoms of about 1,000 diseases.

Figure 2:
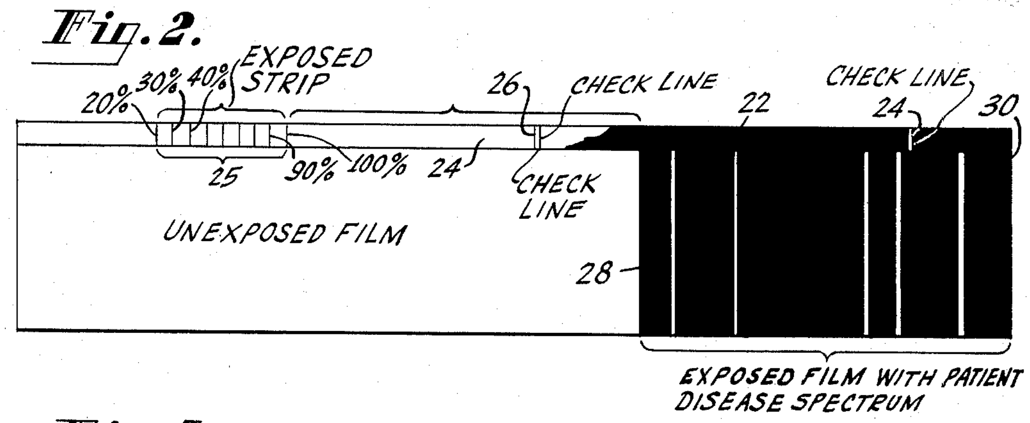
FIG. 2 illustrates the "patient film"—a strip of film on which the disease symptoms exhibited by a patient are recorded.

The film on which the patient's symptoms are recorded is shown in FIG. 2. It may be a length of 35 millimeter film, some 16 inches long. A portion of the film at the right has recorded thereon the patient's symptoms. These appear as continuous vertical lines. Five such lines are shown, however, in practice, there may be many more than five.

An opaque area 22 appears over the patient's disease spectrum. A transparent check line 24 appears within this area at a place corresponding to the transparent line 20 of FIG. 1. The remainder of the film is unexposed except for the opaque strip 24 and the strip 25 with vertical lines. The strip 24 includes a transparent check line 26. The position of line 26 is the same distance from the start 28 of the opaque area of the film as check line 24 is from the edge 30 of the film. The vertical lines 29 which appear in strip 25 are a scale.

In operation, the patient film is placed in a holder and the master film is superimposed over the patient film and moved with respect to the patient film. When the check line 24 of FIG. 2 corresponds with the check line 20 of FIG. 1, a trigger circuit is actuated and light is projected through the two superimposed films. The amount of light which passes through the two films as compared to the amount of light which would pass through the spectrum of the disease alone is indicative of the probability that the patient has a particular disease. For example, if every transparent symptom line of the film of FIG. 1 corresponds to a transparent symptom line of the film of FIG. 2, the probability that the patient has hemophilia is 100% or close to it. In this case, since all of the symptom lines in the film of FIG. 2 are superimposed on all of the symptom lines of the film of FIG. 1, the maximum amount of light possible passes through the two superimposed films.

As is explained in more detail later, when the two films are superimposed and light is passed through the two films, an analog device produces an output quantity which is proportional to the probability that the patient has a particular disease. When this probability is greater than a predetermined value such as 20% or 30% or so, it is temporarily stored. Subsequently, the film of FIG. 1 moves to a position such that its check line 20 superimposes over the check line 26 on the patient film (FIG. 2).

At that time, the two films are illuminated over a narrow, horizontal band (31, FIG. 3) and the symptom lines recorded on the master film are exposed onto the unexposed film of the patient film. Also, in the same narrow horizontal band, the name of the disease is projected onto the patient film and also a beam of light is projected onto the patient film indicating the probability that the disease is present.

The process described above is continued until all of the diseases recorded in the memory (the master film) are matched against the symptoms recorded on the patient film. Each time the probability that the patient has a given disease is greater than the predetermined value, the spectrum of that disease, its name, and the probability that the patient has that particular disease are projected onto the patient film.

Figure 3:
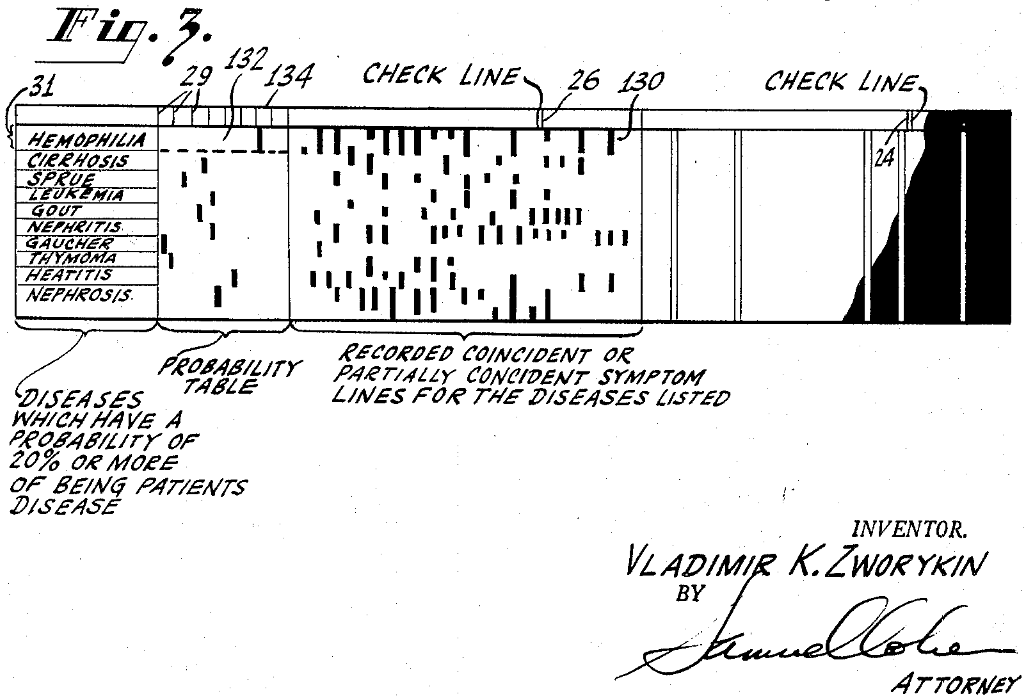
FIG. 3 is the same film as the one shown in FIG. 2 after additional information has been recorded on the film.

The film shown in FIG. 3 indicates that there are 10 diseases any one of which the patient possibly has. It is unlikely that a match of better than 20% will be obtained for more than 10 or so diseases. However, it is possible to record more than 10 diseases on a single film if narrower horizontal bands 31 are employed. It is also possible to stop the comparison after 10 diseases have been recorded, to insert a new patient film, and then to continue the comparison.

An apparatus for performing the comparison discussed above is shown in part in FIG. 4. It includes a transparent, hollow cylinder 30 which may be made of glass or the like. The cylinder is driven by drive means 32 such as a motor. The mechanical connection between the motor and the cylinder is indicated schematically by the dashed line 34 and may include gearing (not shown) on a motor shaft engaged with gearing (not shown) around the peripheral edge of one end of the rotatable cylinder. Other alternative drive means such as belts or the like may be employed instead. The master film 36 on which the disease symptoms are recorded is stored on a reel (not shown) and is driven by the rotatable glass cylinder. This film passes over a first roller 38 when it leaves the reel, and over a second roller 40 when it leaves the glass cylinder.

The patient film 42 is held in a holder 44 which can be opaque in part and transparent in part. The transparent areas are cross-hatched with dashed cross-hatching and the opaque areas with solid cross-hatching. The holder 44 may be hinged, if desired, to facilitate placement to the film, however, this is not shown.

A hollow shaft 46 is located within the glass cylinder and is circumferentially arranged about the axis of the cylinder. This shaft is fixed to the chassis (not shown) as is indicated by the symbol 48. A more detailed view of the shaft is shown later. Mounted to the shaft are a pair of reflectors 50 and 52. Reflector 50 is for the purpose of exposing a horizontal band of the unexposed portion of the patient film. Details are given later. Reflector 52 is for the purpose of reflecting a beam of light from a galvanometer. Details of this reflector and of the position of the galvanometer are also given later.

Element 54 is a lamp. It is on continuously. When the check line 20 (FIG. 1) is superimposed over the check line 24 (FIG. 2), light passes from the lamp 54 through the superimposed check lines to the photocell 56. The output of this photocell actuates the flash lamp 58 as described hereinafter. This lamp is located within a housing 60. The light from the lamp passes through the superimposed symptom spectrum on the patient's film and a particular disease spectrum on the master film. The light which passes through the two films is reflected from reflector 64 onto the photocell 66. The amount of light reaching the photocell and accordingly, the amplitude of the output signal of the photocell is proportional to the probability that the patient has a particular disease.

The purpose of lamp 68 is to apply light through check line 20 (FIG. 1) and check line 26 (FIG. 2) when these check lines are superimposed. The light which passes through these superimposed lines is received by photocell 70. The latter is located within a light-proof housing 72.

Figures 4, 5:
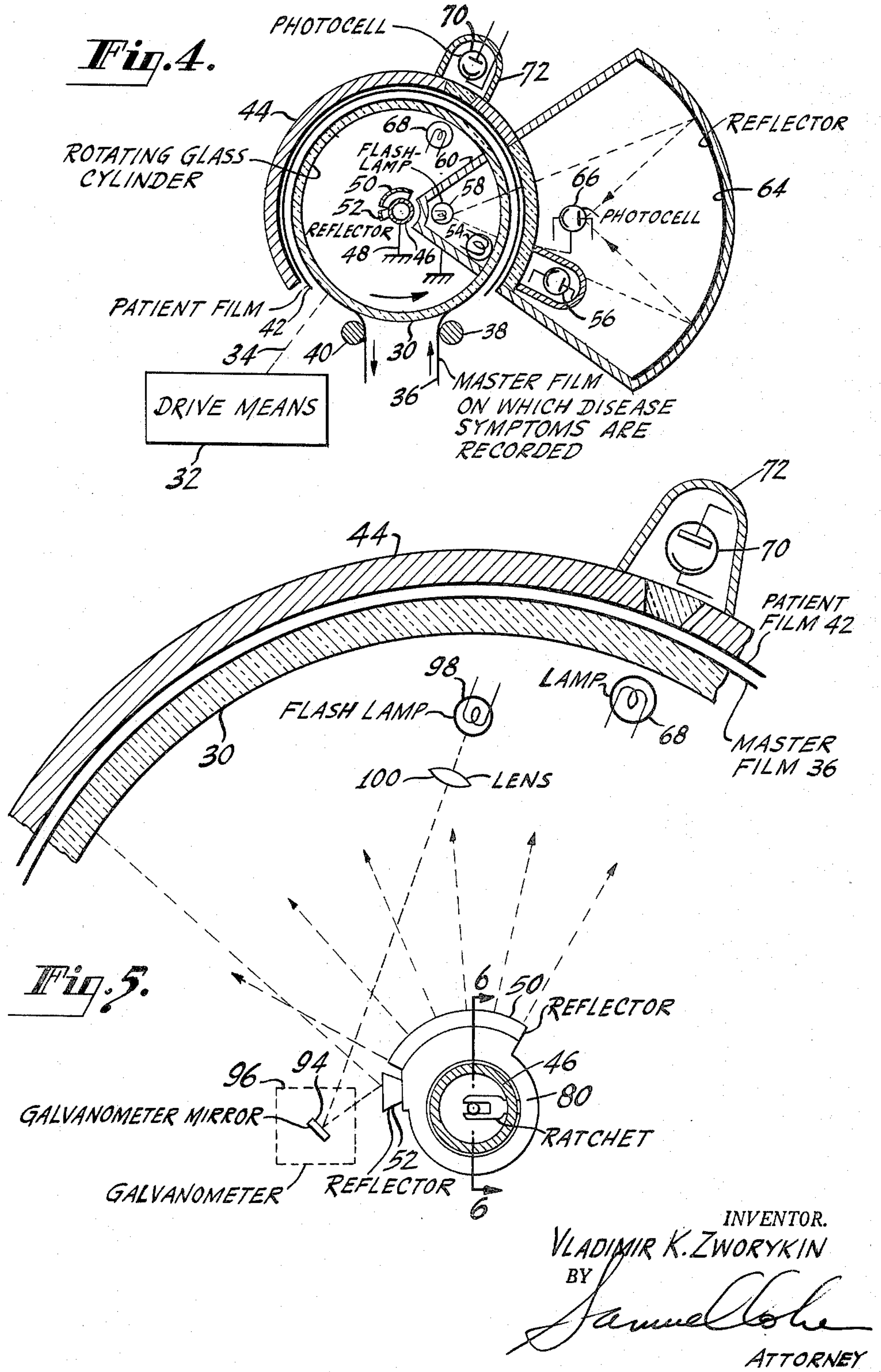
FIG. 4 shows details of an arrangement for matching the patient film with the master film.
FIGS. 5 and 6 are enlarged more detailed drawings of portions of FIG. 4.
Figures 6, 7:
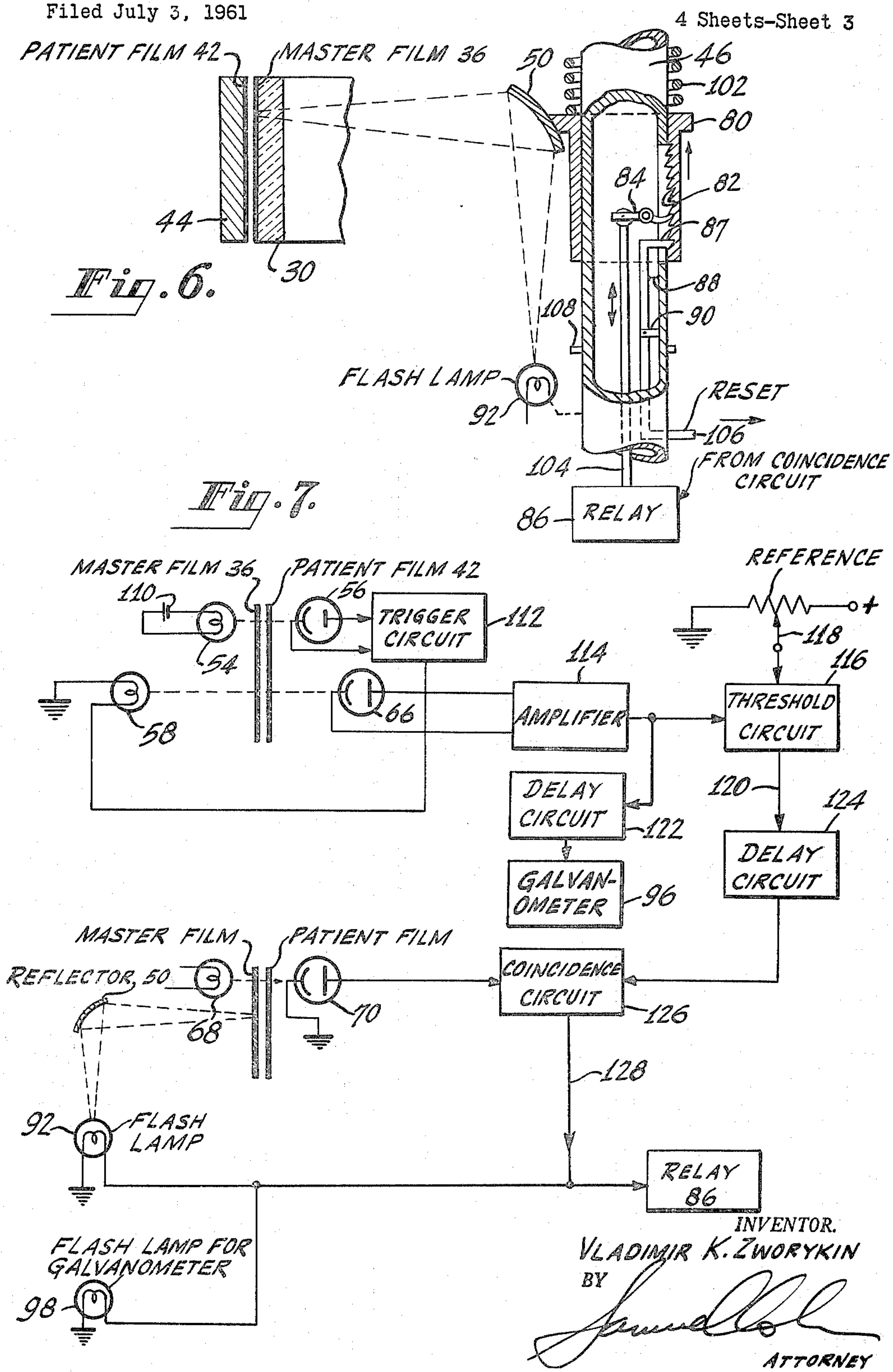
FIG. 7 is a block diagram of circuits employed with mechanical arrangement shown in FIGS. 4–6.

Further details of the arrangement of FIG. 4 are shown in FIGS. 5 and 6. A sleeve 80 is slidably mounted on the hollow shaft 46. This sleeve is formed with a gear rack 82, which extends parallel to the shaft 46 axis, along a portion of its inner surface. A ratchet mechanism 84 which is controlled by a relay 86 is engaged with the gear rack 82. A pawl 87 holds the sleeve in place after the ratchet mechanism has moved the sleeve 80 in the upward direction. This pawl is spring biased toward the inner wall of the cylinder 46 by means of spring 88 and is pivoted at 90.

The cylindrical reflector 50 is shown in cross-section in FIG. 6. It is fixed to the sleeve 80 and moves with the sleeve. The flash lamp for the reflector 50 is shown at 92. This lamp is preferably an elongated lamp which extends generally parallel to the reflector 50.

The reflector 52 is also mounted to the sleeve 80. This reflector, which may be a plane mirror, is seen in FIG. 5. It receives light reflected from the mirror 94 of a galvanometer 96. The latter is shown schematically by a dashed block. The source of light for the galvanometer is a flash lamp 98 whose light is collimated by a lens shown schematically at 100. Both the galvanometer and its light source may be mounted somewhat above the reflectors 52 and 50 so that they do not interfere with the light reflected from the reflectors. Further, all of these elements may be fixed to and movable with the sleeve 80 to maintain the relationship between the source 98, mirror 94 and reflector 52 the same as the reflector 52 is moved by the sleeve.

As already mentioned, the sleeve 80 which mounts the reflectors 50 and 52 is slidably mounted on the hollow shaft 46. A spring 102 which is fixed to the shaft 46 biases the sleeve 80 in the downward direction. In operation, each time the relay 86 receives a pulse, the relay shaft 104 moves in the downward direction and the sleeve 82 moves up one notch. This moves the reflectors 50 and 52 to a position such that they illuminate by reflected light a new portion of the patient film. The pawl 86 holds the sleeve in position. The entire sleeve may be reset to its original position by moving the knob 106 in the direction of the reset arrow. This permits the sleeve 82 to slide down on the shaft until it engages the stop 108.

The various control circuits for the mechanical arrangement illustrated in FIGS. 4, 5 and 6 are shown in FIG. 7.

The lamp 54 is continuously on and it is, therefore, shown supplied with a direct current from battery 110. When the check lines 20, 24 on the master and patient film, respectively, are aligned, the light from the lamp 54 reaches the photocell 56 and the latter actuates the trigger circuit 112. The output of the trigger circuit is applied to the flash lamp 58 which illuminates the superimposed symptom lines in the master and patient films. The amount of light which passes through the two films and reaches the photocell 66 is proportional to the degree of match between the master and patient films.

The photocell output current is applied to amplifier 114 and from the amplifier to the threshold circuit 116. The threshold setting of the threshold circuit is shown as an adjustable voltage source 118. This is the setting which determines the minimum acceptable match between the patient film and the master film. For example, the setting may be made equal to 20%. In other words, the threshold level of the circuit 116 may be such that if the superimposed films passed 20% or more of the light that the master film alone is capable of passing, the threshold circuit 116 produces an output at lead 120.

The output of the amplifier 114 is applied also to a delay circuit 122 and from the delay circuit to the galvanometer 96. The purpose of the delay circuit is to permit the master film to move over the unexposed area of the patient film. The delay circuit, incidentally, may be the delay of the galvanometer movement. After the delay interval imposed by the circuit 126, the galvanometer mirror is deflected through an angle proportional to the output of the amplifier 114.

The output of the threshold circuit 120, when one is present, is applied to the delay circuit 124. Its purpose is the same as that of delay circuit 122. The delay circuit output is applied to a coincidence circuit 126.

Returning now to the center left of FIG. 7, the lamp 68 is the one positioned adjacent to the check line 26 (FIG. 2) of the patient film. When this check line is superimposed over the check line 20 of the master film, the photocell 70 is actuated. Its output is the second input to coincidence circuit 126.

When the two inputs to the coincidence circuit are present, the coincidence circuit produces an output at lead 128. The output actuates relay 86 which, after the delay inherent in the relay, causes the sleeve 80 (FIG. 6) to move up one notch. The coincidence circuit also actuates the flash lamp 92 and the flash lamp 98. The output of the flash lamp 92 is applied to reflector 50 and from reflector 50 to the films. It is at this time that the symptom lines in the master film for one particular disease are recorded on a narrow strip of the patient film. For example, the lines for the disease hemophilia may be recorded on the narrow strip 130 shown in FIG. 3. Simultaneously, the flash lamp 98 illuminates the galvanometer mirror and the mirror projects a beam of light onto the one portion of the narrow strip 132 shown in FIG. 3. This narrow area is shielded from the light projected by the reflector 50 by a small shield (not shown) placed in front of a reflector 50. Alternatively, the patient chart can be arranged so that the probability table (FIG. 3) appears at the right side of the chart beyond the rays of light reflected from the mirror 50. In the developed film, this beam of light appears as the mark 134 shown in FIG. 3. This mark appears under the vertical lines 29 of the scale previously printed on the patient film. The word "hemophilia" is also printed on the patient film.

Figure 8:
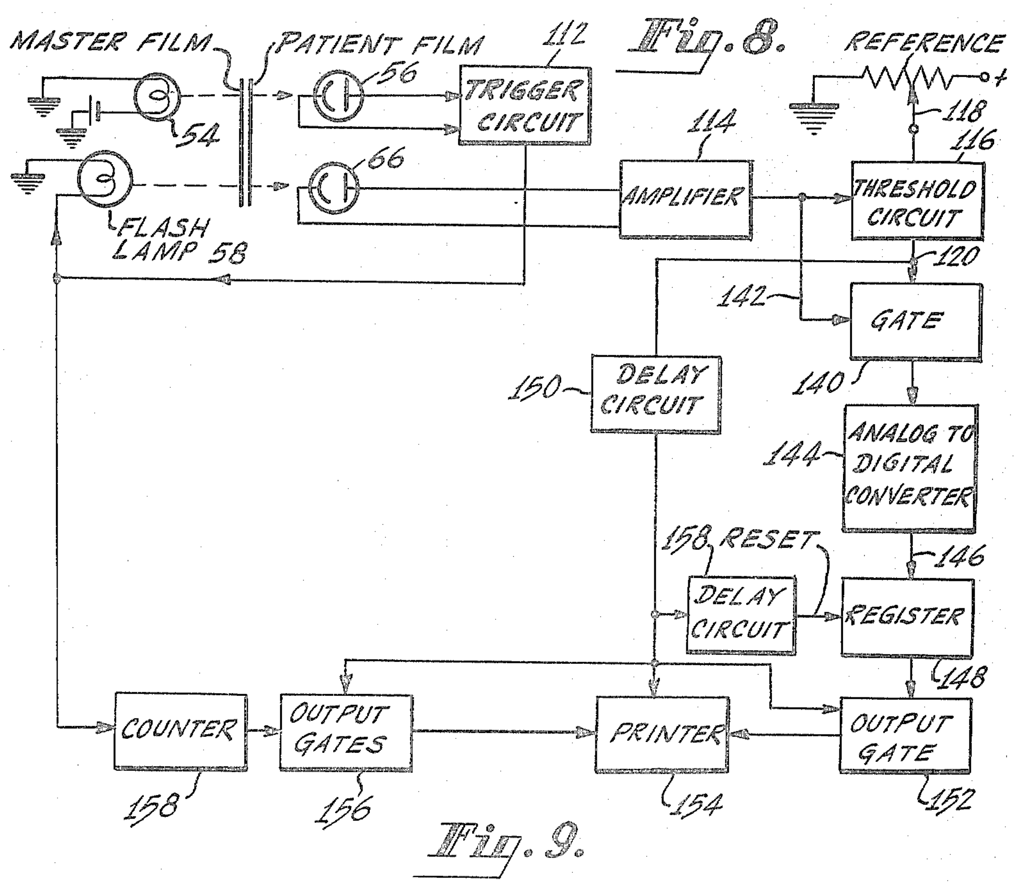
FIG. 8 is a block circuit diagram of another form of the present invention.

A second embodiment of the invention is shown in FIG. 8. In this embodiment, the diagnosis is printed out by a printer, which may be a high speed printer, and the input to the printer consists of digital inputs rather than an analog input.

Figure 9:
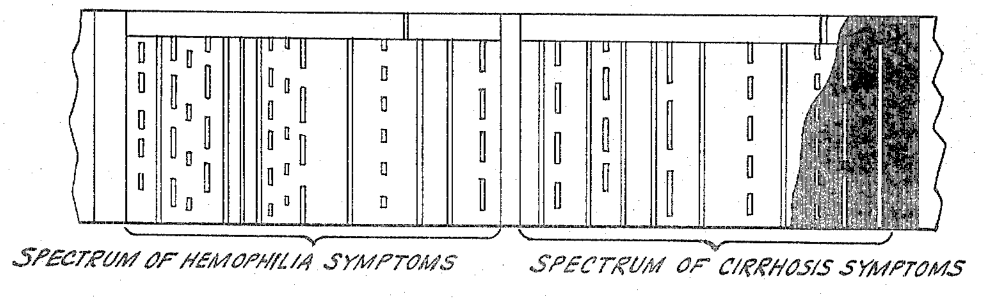
FIGS. 9 and 10 are drawings of the master and patient films, respectively, used in the arrangement of FIG. 8.
Figure 10:
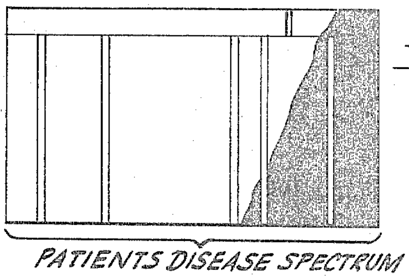

The film employed with the embodiment of FIG. 8 can be of shorter length than the film employed with the embodiment of FIG. 7. A portion of the master film showing the symptoms of two diseases, namely hemophilia and cirrhosis is shown in FIG. 9. The patient's film is shown in FIG. 10. The symptoms for each disease on the master film can be recorded in approximately six inches and the four additional inches required for the name of the disease and chart are not needed. Similarly, the patient's disease spectrum can be printed on six inches of film. An advantage of this arrangement is that the master film is much shorter and requires a smaller reel.

In the circuit of FIG. 8, the flash lamps 54 and 58 are the same as those of the circuit of FIG. 7. Similarly, the photocells 56 and 66, the trigger circuit 112, the amplifier 114, the threshold circuit 116, and the threshold setting 118 are all analogous in structure and function to the like numbered elements of the circuit of FIG. 7. When the threshold circuit produces an output at its output lead 120, it enables gate 140. This gate, when enabled, permits the amplifier output which appears on lead 142 to pass through the gate to an analog-to-digital converter 144. The converter produces a binary word output at lead 146. This binary word is indicative of the probability that the patient has a particular disease. The word is temporarily stored in register 148.

The output of the threshold circuit is applied also to delay circuit 150. The purpose of the delay circuit is to allow sufficient time for the analog-to-digital converter to produce an output and, in the event that the latter is very high speed, it may not be necessary. The output of the delay circuit is applied to output gates 152, printer 154 and output gates 156. The output gates 156 receive their input from a counter 158. The counter begins with a zero count at the start of each comparison and may be a ring counter or a resettable binary counter. The counter counts the number of pulses it receives from trigger circuit 112. Thus, the count stored in the counter 154 may be employed to identify the disease on the master film.

In operation, when the probability is less than a predetermined value, such as 20%, that the patient's disease is the disease with which it is being compared, the threshold circuit produces no output. In this case, the printer produces no output. However, the trigger circuit 112 is actuated and the counter 158 does count each check line and, therefore, each disease symptom spectrum with which the patient film is compared.

When the threshold circuit 116 produces an output, the analog-to-digital converter converts the amplifier 114 output—an analog quantity, to a digital quantity and stores this digital quantity (a binary word) in the register 148. Subsequently, the output gates 152 of the register are enabled by the output of delay means 150 and the output word is printed by the printer 154. This output word may be printed as a binary quantity. Alternatively, the printer may include a memory in which case the binary word can be compared with the binary word in the memory and a percentage in decimal numbers can be printed by the printer. The output gates 156 are also enabled by the output of delay means 150 and the count stored in the counter 154 is printed by the printer. This count can be printed in binary form alongside of the percentage printed by the printer. The count which is printed identifies the disease and this count can be looked up in a previously prepared table of diseases.

It is desirable to reset the register 148 after the quantity stored in the register has been printed and before the register receives a new input. The reset circuit can be actuated by the output of the delay circuit 150. The reset circuit includes a second delay circuit 158 to the reset terminals of the flip-flops in the register 145. The delay of the circuit of 158 insures that the flip-flops are reset at the appropriate time.

The mechanical arrangement employed with the circuit of FIG. 8 is much simpler than the one required in the circuit of FIG. 7. Referring to FIG. 4, all that is needed is the rotating cylinder 30, the lamp 54 and photocell 156, the flash lamp 58, the photocell 66 and the various housings required for light shielding. The reflectors 50 and 52 are not needed. The photocells 70 and 58 are not needed. The galvanometer associated with the reflector 52 and the flash lamp associated with the reflector 50 are not needed. The mechanical arrangement of the sleeve and so on shown in FIG. 6 are not needed.

In the memory illustrated in FIGS. 1 and 9, the symptoms of a disease are recorded as transparent lines on an opaque background. Each transparent line has an area which is dependent on the significance of the disease symptom represented by that line. In an alternative method of representing the disease symptoms, each line or other transparent area which represents a disease symptom passes the same amount of light. The significance is attached to each line electronically rather than physically.

In this type of memory the symptom lines are preferably grouped according to their significance. For example, assume that it is desired to assign to each symptom one of three weights. In this case, the most significant symptom lines are placed on one third of a film area; the next most significant lines are placed on another third of the film area; and the next most significant lines are placed on the remaining third of the film area. A different photocell is then arranged to receive a light output of each third of the film area. The output of the photocell for the lines representing the most significant symptoms is passed through a resistor of value $x$ ohms. The output of the photocell for the next group of symptom lines is passed through a resistor of value $2x$ ohms. The output of the photocell for the group of lines representing the least significant symptoms is passed through a reistor of $3x$ ohms. The current output of the three resistors is summed as, for example, at a junction common to the three resistors. The effect of this arrangement is to electronically weight the symptoms.

The embodiment of the invention shown in FIGS. 4–8 employs a galvanometer to produce an indication which is recorded on the patient film. It is possible to employ other alternative recording means. For example, in cases in which higher operating speed is desired, a cathode ray tube may be employed. The amplifier 114 (FIG. 7) output in this case is employed to deflect the cathode ray beam along one of the coordinates of the screen of the tube as, for example, the $x$ coordinate.

What is claimed is:

1. A system for diagnosing a disease, comprising means for recording the symptoms for each of a number of diseases; means for recording the symptoms exhibited by a patient; means for comparing the record of the symptoms, as a group, recorded for the patient, with each group of symptoms previously recorded for each of the diseases; and means responsive to said comparison for producing a record of the extent of the match between the patient's symptoms and the group of symptoms with which it is compared, only when the match exceeds a given percentage.

2. A system for diagnosing a disease, comprising, in combination, means for recording the symptoms for each of a number of diseases; means for recording the symptoms exhibited by a patient; means for comparing the record of the symptoms, as a group, recorded for the patient, with the records of each group of symptoms previously recorded for each of the diseases; means responsive to said comparison for producing an analog quantity indicative of the extent of the match between the patient's symptoms and each group of symptoms with which it is compared, only when the extent of the match exceeds a given percentage; and means responsive to said analog quantity for producing a list of diseases, and the probability for each that the patient's disease is that disease.

3. In combination, a permanent memory for storing items of information as visual indications; a record containing an item of information in the form of visual indications; means for optically comparing the item on the record with the items stored in the memory; means for deriving from each comparison, solely when the extent of match between the items compared exceeds a given value, an output signal whose amplitude represents the extent of the match; and means responsive to said signal for recording on the same record containing said item of information, a list of all items of information in the memory which match the item on the record to greater than a given percentage, and their percentages of match to the items in the memory, respectively.

4. In combination, a permanent memory for storing in different discrete areas, different items of information, each item as transparent indications on an opaque background; a record containing an item of information as transparent indications on an opaque background; means for comparing the item on the record with the items stored in the memory, comprising means for aligning the record with the different discrete areas, in succession, and for passing light through the record and discrete area, each time the two are aligned; means including light responsive means for deriving from each comparison, solely when the extent of match between the items compared exceeds a given value, an electrical signal whose amplitude represents the extent of the match; and means including a counter for counting the items compared with the item on the record, and an analog-to-digital converter for converting the signal to a digital quantity, for producing a record of all items of information in the memory which match the item on the record to greater than a given percentage, and their percentages of match to the items in the memory, respectively.

5. In combination, a memory comprising a length of film for storing items of information, each item occupying a different area of the film and each item represented on the film as a plurality of transparent areas in an opaque background; a record comprising a relatively small length of film for storing one item of information also in the form of a plurality of transparent areas in an opaque background; means for comparing the item on the record with the items stored in the memory comprising means for superimposing the film of the memory on the film making up the record and driving the film of the memory so that the different areas of film of the memory successively pass over the film of the record; means for deriving from each comparison, solely when the extent of the match between the items compared exceeds a given value, an analog quantity which represents the extent of the match, said means including means for projecting light through the superimposed films each time the films are aligned, a light responsive device arranged to receive the light, and a threshold device for producing an output only when the amount of light passing through the film and received by the light responsive device exceeds a given value; and means responsive to said analog quantity for producing a record of all items of information in the memory which match the item on the record to greater than a given percentage.

6. In the combination as set forth in claim 5, each said item being represented on the film as a group of parallel lines which extend in a direction perpendicular to the direction of movement of the film.

7. In the combination as set forth in claim 5, each said item being represented on the film as a group of parallel lines of the same length and width, some continuous, and some broken.

8. In combination, a memory comprising a length of film for storing items of information, each item occupying a different area of the film and each item represented on the film as a plurality of transparent areas in an opaque background; a record comprising a relatively small length of film for storing one item of information also in the form of a plurality of transparent areas in an opaque background; means for comparing the item on the record with the items stored in the memory comprising means for superimposing the film of the memory on the film making up the record and driving the film of the memory so that the different areas of film of the memory successively pass over the film of the record; means for deriving from each comparison solely when the extent of the match between the items compared exceeds a given value, an analog quantity which represents the extent of the match, said means including means for projecting light through the superimposed films each time the films are aligned and a threshold device for producing an output only when the amount of light passing through the film exceeds a given value; and means responsive to said analog quantity for producing a record of all items of information in the memory which match the item on the record to greater than a given percentage, and their percentages match to the items in the memory, respectively.

9. In combination, a memory comprising a length of film for storing items of information, each item occupying a different area of the film and each item represented on the film as a plurality of transparent areas in an opaque background; a record comprising a relatively small length of film for storing one item of information also in the form of a plurality of transparent areas in an opaque background; means for comparing the item on the record with the items stored in the memory comprising means for superimposing the film of the memory on the film making up the record and driving the film of the memory so that the different areas of film of the memory successively pass over the film of the record; means for deriving from each comparison solely when the extent of the match between the items compared exceeds a given value, an output current the amplitude of which represents the extent of the match, said means including means for projecting light through the superimposed films each time the films are aligned, a photocell arranged to receive the light, and a threshold device coupled to the photocell for producing an output only when the amount of light passing through the film and received by the photocell exceeds a given value; and means responsive to said output current for producing a record of all items of information in the memory which match the item on the record to greater than a given percentage, and their percentages match to the items in the memory, respectively.

10. In combination, a memory comprising a length of film for storing items of informaiton, each item occupying a different area of the film and each item represented on the film as a plurality of transparent areas in an opaque background; a record comprising a relatively small length of film for storing one item of information also in the form of a plurality of transparent areas in an opaque background; means for comparing the item on the record with the items stored in the memory comprising means for superimposing the film of the memory on the film making up the record and driving the film of the memory so that the different areas of film of the memory successively pass over the film of the record; means for deriving from each comparison solely when the extent of the match between the items compared exceeds a given value, an output current the amplitude of which represents the extent of the match, said means including means for projecting light through the superimposed films each time the films are aligned, a photocell arranged to receive the light, and a threshold device coupled to the photocell for producing an output only when the amount of light passing through the films and received by the photocell exceeds a given value; and means including a mirror galvanometer responsive to said current for producing a record of all items of information in the memory which match the item of the record to greater than a given percentage, and their percentages match to the items in the memory, respectively.

11. In combination, a memory comprising a length of film for storing items of information, each item occupying a different area of the film and each item represented on the film as a plurality of transparent areas in an opaque background; a record comprising a relatively small length of film for storing one item of information also in the form of a plurality of transparent areas in an opaque background; means for comparing the item on the record with the items stored in the memory comprising means for superimposing the film of the memory on the film making up the record and driving the film of the memory so that the different areas of film of the memory successively pass over the film of the record; means for deriving from each comparison, solely when the extent of the match between the items compared exceeds a given value, an output current which represents the extent of the match, said means including means for projecting light through the superimposed films each time the films are aligned, a photocell arranged to receive the light, and a threshold device coupled to the photocell for producing an output only when the amount of light passing through the film exceeds a given value; means including a counter for producing a record of all items of information in the memory which match the item on the record to greater than a given percentage; and means including an analog-to-digital converter responsive to said current for recording the percentages of match between items in the memory and the item on the record.

12. A system for diagnosing a disease comprising, in combination, means for recording the symptoms and their significance for each of a number of diseases; means for recording the symptoms, all in the same significance, exhibited by a patient; means for comparing, analog fashion, the record of the symptoms, as a group, recorded for the patient, with the records of each group of symptoms previously recorded for each of the diseases; means responsive to said comparison for producing an analog quantity indicative of the extent of the match between the patient's symptoms and each group of symptoms with which it is compared, only when the extent of the match exceeds a given percentage; and means responsive to said analog quantity for producing a list of diseases, the probability for each that the patient's disease is that disease, and a record of the correspondence between the various symptoms of the patient's disease and that disease.

References Cited by the Examiner

UNITED STATES PATENTS

| | | | |
|---|---|---|---|
| 2,295,000 | 9/42 | Morse | 250—219 X |
| 2,580,270 | 12/51 | Badgley et al. | 250—219 X |
| 2,729,211 | 1/56 | Peter | 128—2.1 |
| 2,795,705 | 6/57 | Rabinow | 250—219 |
| 2,817,829 | 12/57 | Lubkin | 340—174.1 |
| 2,881,416 | 4/59 | Hosken | 250—219 X |
| 3,011,061 | 11/61 | Dickinson | 250—219 X |

RALPH G. NILSON, *Primary Examiner.*

WALTER STOLWEIN, *Examiner.*

UNITED STATES PATENT OFFICE
CERTIFICATE OF CORRECTION

Patent No. 3,215,848 November 2, 1965

Vladimir K. Zworykin

It is hereby certified that error appears in the above numbered patent requiring correction and that the said Letters Patent should read as corrected below.

Column 3, line 51, after "film." insert -- The check line 24 of the patient film (FIGURE 2) is located between the lamp 54 and the photocell 56 of FIGURE 4 and the second check line 26 of the patient film is located between the lamp 68 and the photocell 70 of FIGURE 4. During the movement of the master film (FIGURE 1), its single check line 20 first aligns with check line 24 on the patient film and later in its cycle of movement aligns with check line 26 on the patient film. --; line 52, for "of FIG. 2 corresponds" read -- of the patient film aligns --; line 53, for "FIG.1" read -- the master film --; line 59, after "the" insert -- master --; line 61, after "the", first occurrence, insert -- patient --; line 68, after "superimposed" insert -- with check line 24 on the patient film aligned with check line 20 of the master film --; line 73, after "the" insert -- master --; same column 3, lines 74 and 75, for "superimposes over" read -- aligns with --; column 4, line 1, after "illuminated" insert -- (by source 68 of FIGURE 4) --; column 5, line 29, after "80" insert -- as, for example, by a metal arm or arms, --; column 8, line 15, after "coordinate." insert the following paragraphs:

The choice of circuit elements for implementing the various blocks shown in the block diagram of this application is relatively wide. However, by way of example, a number of different illustrations are given below.

The delay circuit 122 may be the delay inherent in the galvanometer 96 movement as mentioned on page 12, line 4. The delay circuit 124 may include a time delay relay which, after a suitable interval, closes and applies a voltage to the circuit 126. Such relays are commercially available. The delay circuit 158 of FIGURE 8 may be of a similar type. The coincidence circuit 126 of FIGURE 7 may be a relay AND gate of the type shown on page 40 of the volume by Ledley, "Digital Computer and Control Engineering", McGraw-Hill Book Company, New York, 1960. Alternatively, the coincidence circuit may be a diode AND gate, such as shown on page 310 of Ledley, or a transistor AND gate, such as shown on page 122 of the volume by Bukstein, "Digital Counters and Computers", Reinhart and Company, 1960.

The analog-to-digital converter 144 of FIGURE 8 may be of the drum type illustrated on page 743 of Ledley or the electronic type illustrated on page 745 of Ledley or on page 210 of Bukstein. The register 148 of FIGURE 8 may be a group of flip-flops such as shown on page 153, Fig. 8-8, of Bukstein. The flip-flops making up the register may be transistor flip-flops, such as shown on page 126 or 127 of Bukstein. The threshold circuit 116 of FIGURES 7 and 8 may simply be a biased diode or it may be a linear transistor amplifier which is biased below cut-off. In the case of a diode, the diode may be connected essentially in shunt with the signal path and may be forward-biased to a value such that it by-passes signals of smaller than a given amplitude and is cut off by input signals of greater than a given amplitude. In its cut-off condition, the diode acts like a high impedance and permits the portion of the signal which exceeds the bias value to pass to the following stage.

same column 8, line 18, after "recording" insert -- , in groups, --; line 23, for "means responsive to said comparison for" read -- means coupled to said comparing means and responsive to said comparison for --; line 29, after "recording" insert -- , in groups, --; lines 34 and 35, for "means responsive to said comparison for" read -- means coupled to said comparing means and responsive to said comparison for --; line 39, for "means responsive to" read -- means coupled to said means for producing an analog quantity and responsive to --; line 47, after "means" insert -- coupled to said comparing means --; line 51, after "means" insert -- coupled to said last-named means and --; line 65, after "and" insert -- a --; line 67, after "means" insert -- positioned to receive the light passed through the record and a discrete area --; line 71, after "counter" insert -- coupled to said comparing means --; line 72, after "converter" insert -- coupled to said light-responsive means --; line 73, for "signal to a digital quantity" read -- signals to respective digital quantities --; column 9, line 15, after "means" insert -- coupled to said comparing means --; line 25, after "means" insert -- coupled to said means for producing an analog quantity and --; line 50, after "means" insert -- coupled to said comparing means --; same line 50, after "comparison" insert a comma; line 57, after "means" insert -- coupled to said means for deriving an analog quantity and --; column 10, line 1, after "means" insert -- coupled to said comparing means --; same line 1, after "comparison" insert a comma; line 10, after "means" insert -- coupled to said threshold device and --; line 28, after "means" insert -- coupled to said comparing means --; line 29, after "comparison" insert a comma; line 39, after "galvanometer" insert -- coupled to said means for deriving an output current and --; line 56, after "means" insert -- coupled to said comparing means --; line 66, after "counter" insert -- coupled to said comparing means --; line 69, after "converter" insert -- coupled to said threshold device --; line 73, after "recording" insert -- , in groups, --; same column 10, line 75, after "recording" insert -- , in a group, --; column 11, line 4, after "means" insert -- coupled to said comparing means and --; line 9, after "means" insert -- coupled to the last-named means and --.

Signed and sealed this 20th day of December 1966.

(SEAL)
Attest:

ERNEST W. SWIDER
Attesting Officer

EDWARD J. BRENNER
Commissioner of Patents